March 26, 1946.  G. J. GOEPFERT ET AL  2,397,101
ABRASIVE ARTICLE AND METHOD OF MANUFACTURING THE SAME
Filed Nov. 25, 1944

Inventors
George J. Goepfert
Ralph H. Rushmer
by W. J. Poley
Attorney

Patented Mar. 26, 1946

2,397,101

UNITED STATES PATENT OFFICE 2,397,101

ABRASIVE ARTICLE AND METHOD OF MANUFACTURING THE SAME

George J. Goepfert and Ralph H. Rushmer, Niagara Falls, N. Y., assignors to The Carborundum Company, Niagara Falls, N. Y., a corporation of Delaware Application November 25, 1944, Serial No. 565,104

9 Claims. (Cl. 51—206)

This invention relates to improved abrasive articles and methods of manufacturing the same. More particularly, the invention is concerned with very thin abrasive wheels such as those which are known as "cutting-off", sometimes shortened to "cut-off" wheels, and other wheels which are very thin in proportion to their diameter.

Cut-off wheels are used in large quantities for cutting deep narrow grooves or for cutting off blanks of material and might be described as an abrasive saw. They are frequently made with a resinoid bond such as a heat-hardened phenolformaldehyde condensation product, one form of which is sold under the trade-mark "Bakelite." They are used in diameters ranging from 2" to as much as 20" and in thicknesses from $\frac{1}{32}$" to $\frac{1}{8}$". They are operated at relatively high speeds, 15,000 surface per minute being a representative speed. Because of the very high speeds and the type of operation in which they are employed, they are subjected to unusual stresses, both tensile because of centrifugal force, and torsional because of the side pressure which is sometimes exerted during their use. Because of their extreme thinness, great care must be taken in their manufacture as in distributing the mix uniformly in the mold and in applying uniform pressure over the entire area of the articles when they are pressed. The resinoid bonded wheels are commonly cold molded from a dry distributable type mix such as is described in the Martin Patent Re. 19,318 or the Roble Patent No. 2,076,517. After they have been molded to shape the formed articles are taken from the mold and given a heat treatment to advance the resin to the final insoluble infusible or so-called "C" stage.

Unless the mix is distributed very uniformly throughout the mold and unless the press platens are held to a close degree of parallelism, the wheels are not wholly uniform and any lack of uniformity results in unusual stresses due to centrifugal force. Because of these difficulties in obtaining uniformity and because of the conditions under which the wheels are used, breakage is a serious problem. All abrasive wheels are tested at speeds approximately 50% above their operating speeds and during this test the wheels which are defective are eliminated because they break when being speeded. However, minor defects may not be sufficient to cause breakage in the speeder and as a result some wheels are necessarily put on the market which are not strictly perfect.

In addition to the cut-off wheels which, as stated, are classified to include only wheels up to $\frac{1}{8}$" in thickness, there are also other types of comparatively thin wheels of large diameter such as relatively thin wheels which are used for sawing stone or other materials where difficulties with breakage are sometimes experienced. Such wheels are made in relatively large diameters and in thicknesses of $\frac{1}{16}$" to $\frac{1}{4}$", one size which is used to a considerable extent being $\frac{1}{16}$" thick by 20" in diameter.

It is highly desirable to increase the effective strength of such wheels and we have found a method by which such increased strength can be imparted without a material increase in the cost. Briefly stated, our invention resides in the provision on one side of a cut-off wheel, or other abrasive wheel which is thin in proportion to its diameter, of a reinforcing element which increases the effective strength of such wheel and minimizes the tendency for breakage.

It is accordingly an object of the present invention to provide improved resinoid bonded cut-off wheels having increased effective tensile strengths. Another object of the invention is to provide a method for reinforcing cut-off wheels which will be economically practical. Another object of the invention is to provide resinoid bonded cut-off wheels provided on one of their sides with a reinforcing element. Further objects of the invention will appear from a consideration of the disclosure hereinafter made.

We have made the remarkable discovery that the speed at which cut-off wheels burst can be very materially increased by providing on one side only of such wheel a thin sheet of resin impregnated fabric such as a light weight cloth or paper in the form of a disc having a diameter up to about one-half that of the abrasive wheel itself. We have tried applying such sheets to both sides of wheels and find that there is no improvement in the bursting speed but in some instances actually a reduction. On the other hand, we have used different types of cloth and paper impregnated with resin applied to only one side of the wheels and in every instance the speed at which the wheel burst by reason of centrifugal force has been materially increased.

An understanding of our invention will be facilitated by reference to the attached drawing, wherein.

Figure 1:
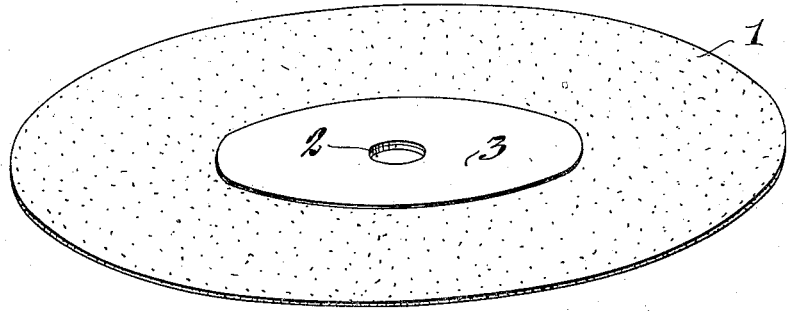
Figure 1 is a perspective view of a cut-off wheel made in accordance with our invention.
Figure 2:
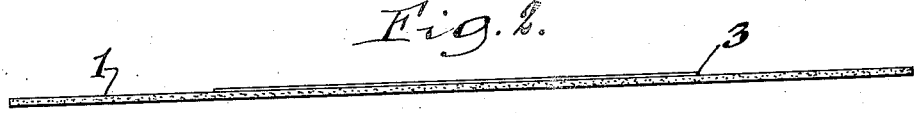
Figure 2 is a sectional view of such a wheel.

Referring to the drawing, the cut-off wheels of our invention consist of a resinoid bonded abrasive body 1 provided at its center with an arbor hole 2 for mounting on a rotatable shaft and provided on one face only with a sheet of resin impregnated fabric 3.

Although our improved wheels may be made by applying the sheet of resin impregnated fabric to either side of the wheel, we have found it much more practical to put the sheet on the upper surface of the mix from which the wheel is to be molded. We have therefore illustrated the method of making our wheels wherein this particular procedure is followed.

Figure 3:
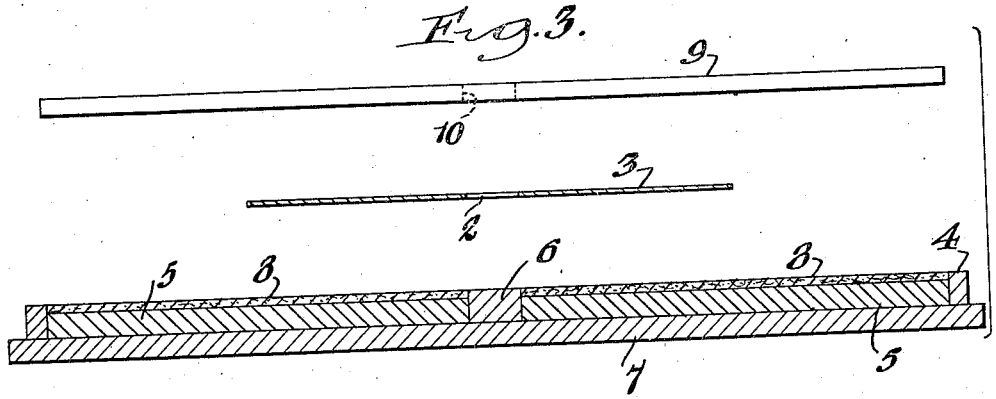
Figure 3 is a side elevation, partly in section, showing the method by which our improved wheels are made.

Such method may be easily understood by reference to Figure 3. In that drawing there is shown a mold barrel 4 surrounding a bottom plunger 5 and provided with an arbor pin 6. The assemblage is placed on a bottom plate 7. Abrasive mix 8 is distributed uniformly throughout the mold and struck off to form a layer of uniform thickness. In the drawing immediately above the mold assembly is shown a sheet of the resin impregnated paper 3 which is centered on the wheel by placing over the arbor pin 6. The mold is then closed by lowering the top plunger 9, which is provided with a hole 10 for centering over the arbor pin 6. Thereafter the assemblage is placed in a press and the mix is subjected to a pressure of 2,000 pounds per square inch.

After the wheel has been pressed, the top plunger is removed and the wheel having the sheet of resin impregnated fabric 3 stuck to one of its sides is placed on a suitable support and put into an oven and baked to harden the resin bond.

The resin impregnated fabric 3 may be any of a number of different materials. One material which we have found very satisfactory is a commercial product manufactured by the Resinous Products Company of Philadelphia under the trade name "Tego" film. This material is approximately .002–.003" thick and consists of a thin sheet of paper impregnated with a phenol-aldehyde resin. The sheet consists of approximately 30% paper and 70% resin.

Instead of the "Tego" film, we have also used other kinds of paper such as an unplasticized kraft paper about .007–.010" thick and containing about 35% of a heat-hardenable phenol-aldehyde resin. We have also used resin impregnated cloth fabrics including a cotton cloth having a thread count of 80 x 80 and sold by the Spaulding Fibre Company of Tonawanda, New York, under the name "LeNat Spauldite Filler." Commercial papers which we have also used and found to be satisfactory are products also put out by Spaulding Fibre Company as "XX Treated Paper" and "XPK20." Another cloth fabric which we have used is also sold by Spaulding Fibre Company as "LE Treated Fabric." This material is a cotton fabric having a thread count of 56 x 60 containing about 60% of a heat-hardenable phenol-formaldehyde resin.

In order to determine the reinforcing effect of the sheet material of our invention we made up a number of resinoid bonded cut-off wheels 12" in diameter by $\frac{3}{32}$" thick and provided with an arbor hole 1" in diameter. The reinforcing sheets were 6" in diameter.

The abrasive mix was prepared by mixing 81 parts of 50 grit fused alumina abrasive grain with 3 parts of liquid phenol-formaldehyde resin to distribute the liquid uniformly over the grain. The thus wetted grains were then mixed with 16 parts of a mixture consisting of 75% pulverized A stage phenol-formaldehyde resin and 25% 200 mesh flint. The resulting mix was dry to the touch and easily spreadable and the powdered material was all attached to the abrasive grains.

The mix thus prepared was charged into a suitable mold and the resin impregnated sheet was placed on top of the levelled mix just prior to placing the top plate over the arbor pin. Wheels were pressed at 2,000 pounds per square inch, removed from the mold, and cured by heating for 8 hours at 175° F., raising the temperature up to 350° F. over a period of 7 hours and holding at that temperature for 6 hours.

After the wheels had been cooled to room temperature they were bored and edged and mounted on a rotatable shaft, using a flange 4" in diameter. The shaft was then rotated, the speed being gradually increased until the wheels burst due to the centrifugal stresses.

The following table shows the bursting speed in surface feet per minute of unreinforced wheels and wheels reinforced with different materials, together with the percentage increase obtained by the use of the reinforcement.

| Type of reinforcement | Bursting speed surface feet per minute | Percent increase over unreinforced wheel |
| --- | --- | --- |
| Unreinforced | 19,600 | |
| Resin impregnated kraft paper | 22,400 | 14.3 |
| Resin impregnated cloth | 21,800 | 11.3 |
| "Tego" film | 23,500 | 19.9 |

By way of comparison, we also made wheels in which reinforcing sheets were applied to both sides of the wheel. Where resin impregnated paper and cloth identical with those used in the tests reported in the table just above were used, the wheels having the sheets on both sides actually burst at lower speeds than where no sheet material was used, the percentage decrease being 8.4 and 14.5%, respectively. Sheets of "Tego" film on both sides of the wheels increased the bursting speed only 8.4% as compared to the 19.9% where the "Tego" film was used on only one side.

As stated above, we have not found that it makes any difference in the amount of reinforcement, whether the reinforcing sheet is put on the bottom or on the top of the wheel. However, we find it much more satisfactory to put the sheet on the levelled mix as illustrated in the drawing because if the sheet is put in the bottom of the mold it is necessary to first clean the mold very carefully and then to exercise caution that no mix gets under the sheet when the mix is put into the mold and levelled. We therefore much prefer to use the steps described in connection with the drawing.

The reinforcing sheet of the cut-off wheels of our invention is firmly welded to the side of the wheel through fusion and fluxing together of the impregnating resin of the sheet with the powdered resin bond of the wheel. When the articles are heated to cure the resin bond the impregnating resin of the reinforcing sheet first softens, as does the resin bond of the abrasive mix, and finally cures to the infusible insoluble condition. The reinforcing sheets are therefore strongly attached to the wheels and, for that matter, are so intimately welded to the wheel that they cannot be detached.

Figure 4:
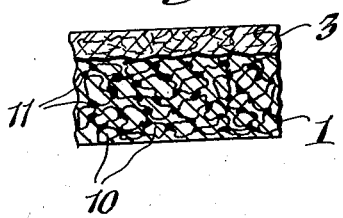
Figure 4 is a partial section, greatly enlarged, through a section of a cut-off wheel made in accordance with the invention.

This condition is depicted in Figure 4, which is the partial section greatly enlarged. In that drawing the abrasive article 1 is made up of abrasive grains 10 and bond 11. As there depicted, the resin which was present in the reinforcing sheet 3 has, in part, flowed down and joined to the abrasive grains on the top of the article and the bond near the upper surface of the wheel to form strong attachment of the reinforcing sheet 3 to the bonded article 1.

Where we have referred to a phenolic resin or a phenol-formaldehyde resin we mean to include those resins formed by the reaction of phenol, cresol, or other compound encompassed within the generic term "phenol." Similarly, instead of formaldehyde, which is commonly supplied in the form of an aqueous solution, other equivalent materials such as paraformaldehyde or hexamethylene tetramine, or for that matter, other aldehydes such as furfural or acetaldehyde may be used in making the so-called "phenolic" resin.

We have described our invention by reference to specific examples and materials, but other modifications and embodiments may be employed. The mix may be varied, as by employing other wetting agents such as the furfural of the Martin Patent Re. 19,318. Generally speaking, it is not necessary to reinforce wheels which are less than about 8" in diameter and only in such diameters when the wheels are very thin although obviously the kind and size, as well as the proportion of abrasive grain and the composition of the bond such as the kind of filler if any which is used therein, may also be modified in accordance with the practices well known in the art. Likewise, the kind of reinforcing material and the proportion and kind of resin incorporated therewith may be varied and other modifications and embodiments can be practiced, all as defined in the appended claims.

We claim:

1. A resin bonded abrasive wheel having a ratio of diameter to thickness not less than about 60 comprising abrasive grains bonded with a heat-hardened resin and a sheet of a fabric impregnated with a heat-hardened resin attached to one side only of said wheel, the diameter of the said fabric sheet being not more than about one half the diameter of the abrasive wheel.

2. A resin bonded cut-off wheel having a thickness not greater than about 1/8" comprising abrasive grains bonded with a heat-hardened phenolic resin and a sheet of a fabric impregnated with a heat-hardened phenolic resin attached to one side only of said wheel, the diameter of the said fabric sheet being not more than about one half the diameter of the abrasive wheel.

3. A resin bonded cut-off wheel having a thickness not greater than about 1/8" comprising abrasive grains bonded with a heat-hardened resin, and a sheet of paper impregnated with a heat-hardened resin attached to one side only of said wheel, the diameter of said paper sheet being not more than about one half the diameter of the abrasive wheel.

4. A resin bonded cut-off wheel having a thickness not greater than about 1/8" comprising abrasive grains bonded with a heat-hardened resin, and a sheet of cloth impregnated with a heat-hardened resin attached to one side only of said wheel, the diameter of the said cloth sheet being not more than about one half the diameter of the abrasive wheel.

5. A resin bonded abrasive wheel having a ratio of diameter to thickness not less than about 60, comprising abrasive grains bonded with a heat-hardened phenol-formaldehyde resin and a sheet of a fabric impregnated with a heat-hardened phenol-formaldehyde resin attached to one side only of said wheel, the diameter of the said fabric sheet being not more than about one half the diameter of the abrasive wheel.

6. A method of reinforcing a resin bonded cut-off wheel which comprises preparing a mixture which is dry to the touch and readily distributable and which comprises abrasive grains and a heat-hardenable phenolic resin, distributing said mixture uniformly in a mold, placing a sheet of fabric impregnated with a heat-hardenable phenolic resin and having a diameter of approximately one half that of the wheel on top of the mixture, subjecting the mixture and the fabric sheet to pressure to form an article which can be removed from the mold, removing the article from the mold, and heating the article to cause the resins first to flux and then to harden to a substantially infusible and insoluble condition, whereby the resin impregnated sheet becomes firmly attached to the side of the wheel and reinforces it against centrifugal stresses.

7. A method of reinforcing a resin bonded cut-off wheel which comprises preparing a mixture which is dry to the touch and readily distributable and which comprises abrasive grains and a heat-hardenable phenol-formaldehyde resin, distributing said mixture uniformly in a mold, placing a sheet of fabric impregnated with a heat-hardenable phenol-formaldehyde resin and having a diameter of approximately one half that of the wheel on top of the mixture, subjecting the mixture and the fabric sheet to pressure to form an article which can be removed from the mold, removing the article from the mold, and heating the article to cause the resins first to flux and then to harden to a substantially infusible and insoluble condition, whereby the resin impregnated sheet becomes firmly attached to the side of the wheel and reinforces it against centrifugal stresses.

8. A method of reinforcing a resin bonded cut-off wheel which comprises preparing a mixture which is dry to the touch and readily distributable and which comprises abrasive grains and a heat-hardenable phenolic resin, distributing said mixture uniformly in a mold, placing a sheet of paper impregnated with a heat-hardenable phenolic resin and having a diameter of approximately one half that of the wheel on top of the mixture, subjecting the mixture and the paper sheet to pressure to form an article which can be removed from the mold, removing the article from the mold, and heating the article to cause the resins first to flux and then to harden to a substantially infusible and insoluble condition, whereby the resin impregnated sheet becomes firmly attached to the side of the wheel and reinforces it against centrifugal stresses.

9. A method of reinforcing a resin bonded cut-off wheel which comprises preparing a mixture which is dry to the touch and readily distributable and which comprises abrasive grains and a heat-hardenable phenolic resin, distributing said mixture uniformly in a mold, placing a sheet of cloth impregnated with a heat-hardenable phenolic resin and having a diameter of approximately one half that of the wheel on top of the mixture, subjecting the mixture and the cloth sheet to pressure to form an article which can be removed from the mold, removing the article from the mold, and heating the article to cause the resins first to flux and then to harden to a substantially infusible and insoluble conditions, whereby the resin impregnated sheet becomes firmly attached to the side of the wheel and reinforces it against centrifugal stresses.

GEORGE J. GOEPFERT.
RALPH H. RUSHMER.